| United States Patent [19] | [11] | 4,303,382 |
|---|---|---|
| Gellert | [45] | Dec. 1, 1981 |

[54] MELT SPINNING NOZZLE TIP

[76] Inventor: Jobst U. Gellert, 7A Prince St., Glen Williams, Ontario, Canada

[21] Appl. No.: 153,961

[22] Filed: May 28, 1980

[30] Foreign Application Priority Data

May 21, 1980 [CA] Canada ................................. 352349

[51] Int. Cl.³ .............................................. B29F 1/03
[52] U.S. Cl. .............................. 425/566; 264/328.12; 425/568
[58] Field of Search .............................. 425/564–566, 425/568–571; 264/328.12

[56] References Cited

FOREIGN PATENT DOCUMENTS 1288393 2/1962 France ............................ 264/328.12

*Primary Examiner*—Thomas P. Pavelko
*Attorney, Agent, or Firm*—Riches, McKenzie & Herbert

[57] ABSTRACT

This invention relates to an improved valve-gated injection molding system. The hot runner passage through which the melt flows to the cavity is divided into three spiral-shaped channels which converge again immediately before the gate, thereby imparting a curving motion to the melt as it flows outward from the gate in the cavity. This avoids unidirectional molecular orientation of the melt, thereby providing a stronger molded product. In a preferred embodiment of the invention, the melt channels reduce in helical diameter and cross sectional area as they approach the gate, thereby accelerating the swirling motion of the melt.

7 Claims, 6 Drawing Figures

MELT SPINNING NOZZLE TIP

BACKGROUND OF THE INVENTION

This application relates to an improved valve-gated system for injection molding plastic, and more particularly to a new configuration of the hot runner passage leading to the gate.

It is well known that molecular orientation effects the strength of injection molded plastic products. Orientation is generally thought to be caused by the high shear stresses resulting from rapidly injecting the melt into the cavity and with a normal or conventional molding arrangement is usually parallel to the filling direction. This resulting unidirectional orientation causes the molded product to be stronger in the direction of orientation and weaker at right angles to the direction of orientation. For instance, a center-gated coffee cup would be stronger in the vertical direction, but very weak in the hoop direction. On the other hand, it is well known to form plastic film with a biaxial molecular orientation to improve its strength characteristics.

More recently, rotation of the mold has been used in injection molding to form the product with a biaxial or multiaxial molecular orientation. While this has been successful in achieving increased product strength, it is not a practical solution to the problem because of difficulties in constructing and operating the spinning molds. It is not suitable for multicavity applications, and is very difficult for irregular shaped products.

Even more recently, attempts have been made to achieve biaxial or multiaxial molecular orientation by designing the mold cavity to provide the inflowing melt with an irregular flow pattern. This has usually been in the form of ribs or other shapes against which the incoming melt impinges to spread or disperse it in different directions. While having better results in terms of increased product strength, this method or concept, of course, has the disadvantage that the product must include the ribs or other shapes introduced into the design to provide this filling action. Needless to say, this is not satisfactory for a large range of products.

SUMMARY OF THE INVENTION

Accordingly, it is an object of the present invention to at least partially overcome the disadvantages of these prior systems by providing a valve-gated injection molding system wherein the configuration of the hot runner passage leading to the gate imparts a curving motion to the melt entering the cavity, thereby reducing unidirectional molecular orientation of the molded product.

To this end, in one of its aspects, the invention provides a valve-gated injection molding system comprising a gate in a cavity plate leading to a cavity, a molding machine, a hot runner passage extending through a heated heater cast for conveying pressurized plastic melt from the molding machine to the gate, an elongated valve pin to reciprocate in a generally cylindrical bore in the heater cast between open and closed positions, the valve pin having a driven end and a tip end which is received in the gate in the closed position, and valve pin actuating mechanism, having the improvement wherein the heater cast has a nozzle tip portion through a portion of which the hot runner passage is separated into a plurality of channels, each channel being in the form of a spiral around the valve pin, the channels converging adjacent the gate, whereby a curving motion is imparted to the melt when it enters the cavity through the open gate thereby reducing unidirectional molecular orientation of the melt.

Further objects and advantages of the invention will appear from the following descriptions, taken together with the accompanying drawings.

Figure 1:
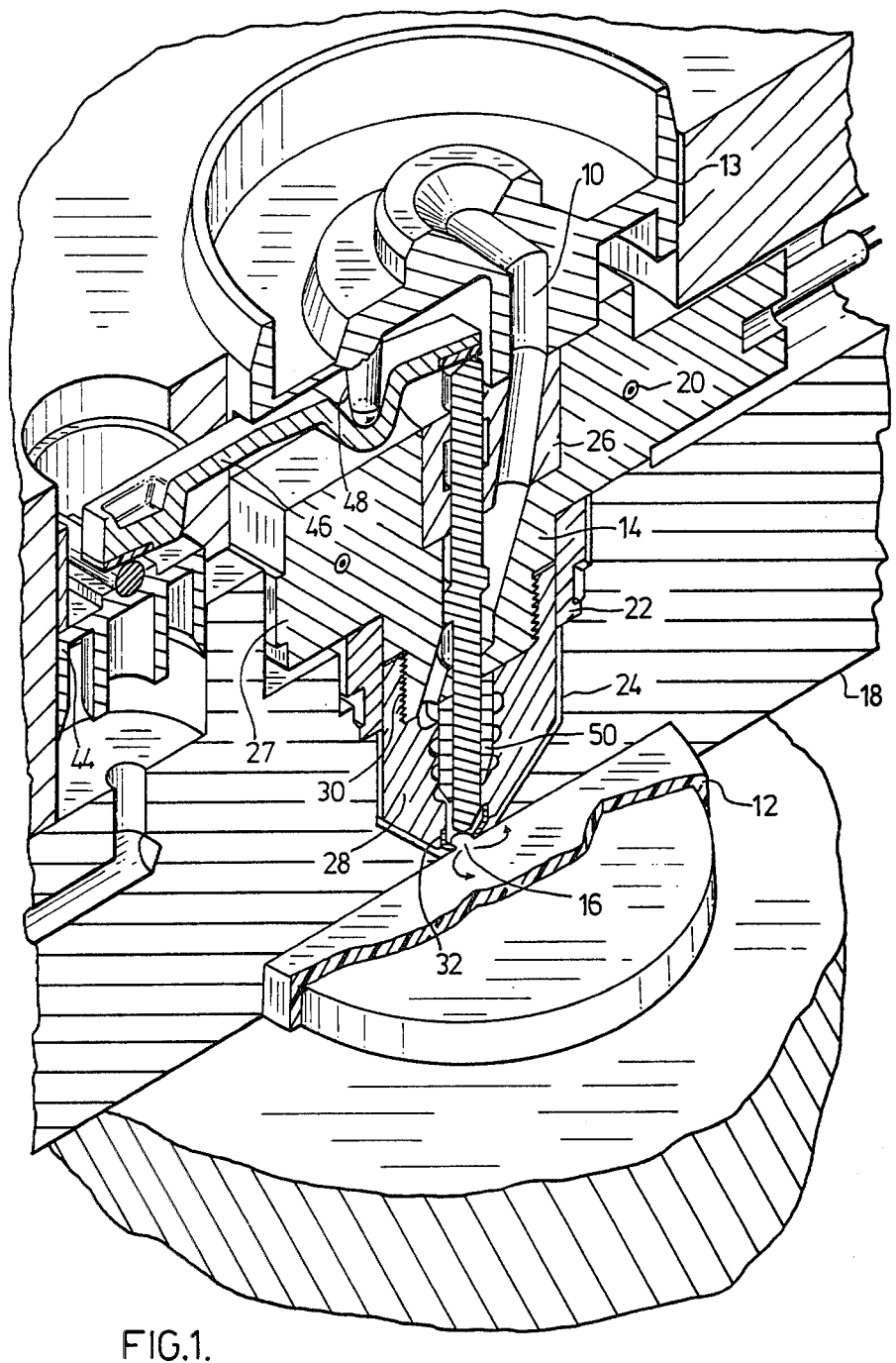
FIG. 1 is a cut-away perspective view of a valve-gated injection molding system according to a preferred embodiment of the invention.

Reference is first made to FIG. 1 which shows a portion of an injection molding system having a hot runner passage 10 through which pressurized melt flows from a molding machine (not shown) to a cavity 12. The hot runner passage 10 extends through a back plate 13 and heater cast 14 from which the melt passes through a gate 16 in the cavity plate 18 and into the cavity 12. The heater cast 14 is heated by an electrical heating element 20 which is cast into it. The heater cast 14 is securely mounted in the cavity plate 18 by insulation bushing 22 and air space 24 is provided to reduce heat loss from the hot heater cast 14 to the cooled cavity plate 18. The hot runner passage 10 extends through a bushing seal 26 which is seated in the heater cast 14 and abuts against the back plate 13.

Figure 2:
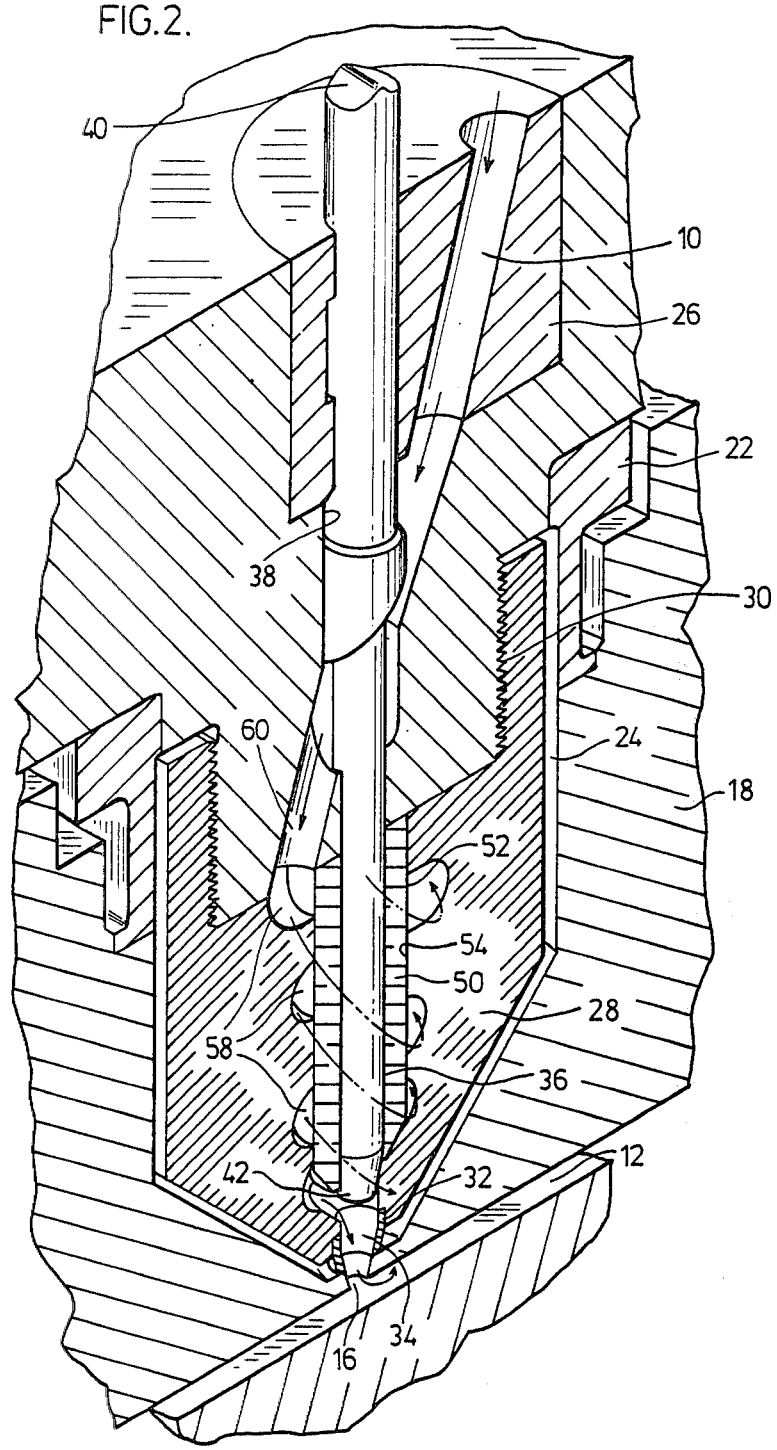
FIG. 2 is an enlarged view of a portion of the system seen in FIG. 1.
Figure 3:
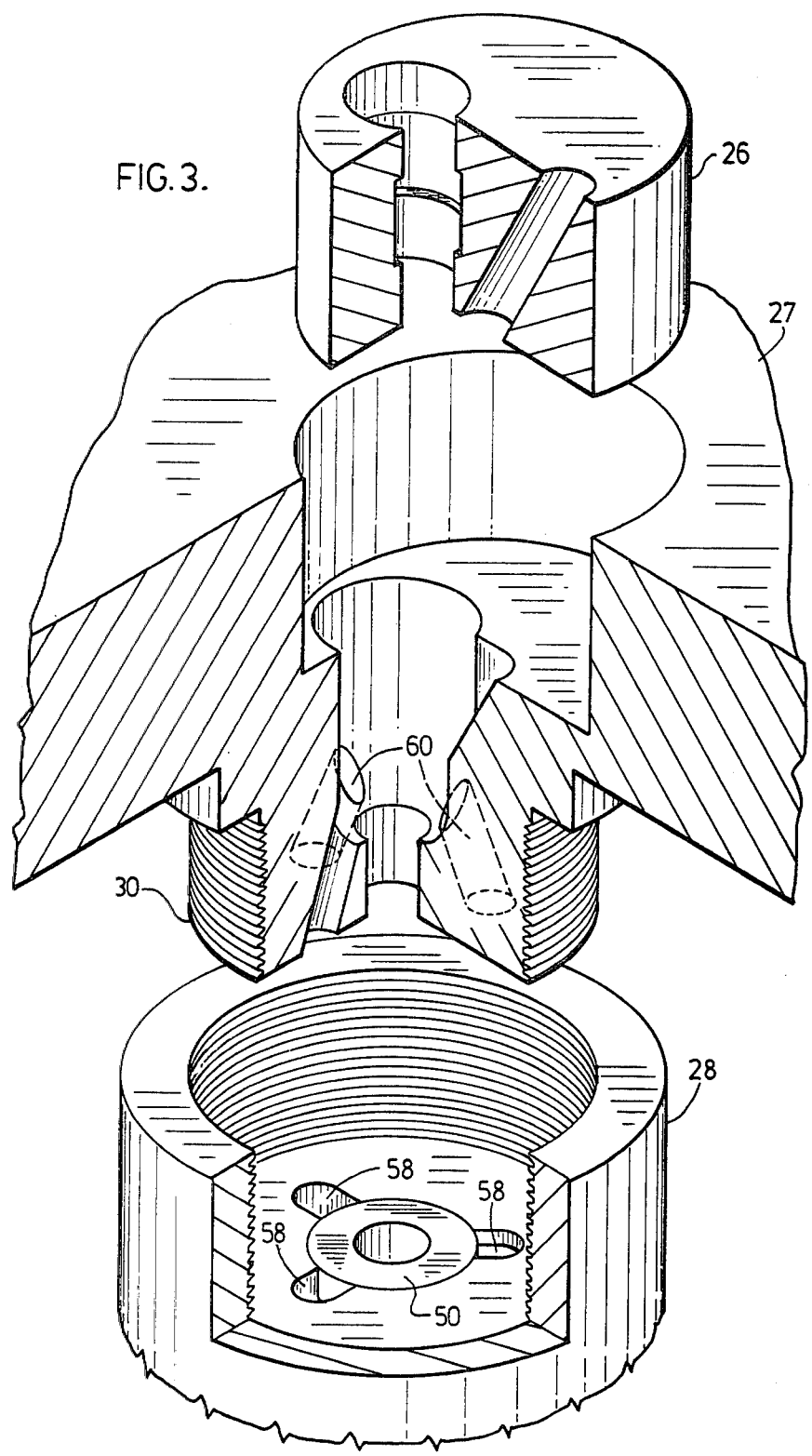
FIG. 3 is a cut-away exploded perspective view of a portion of the system seen in FIG. 1.
Figure 4:
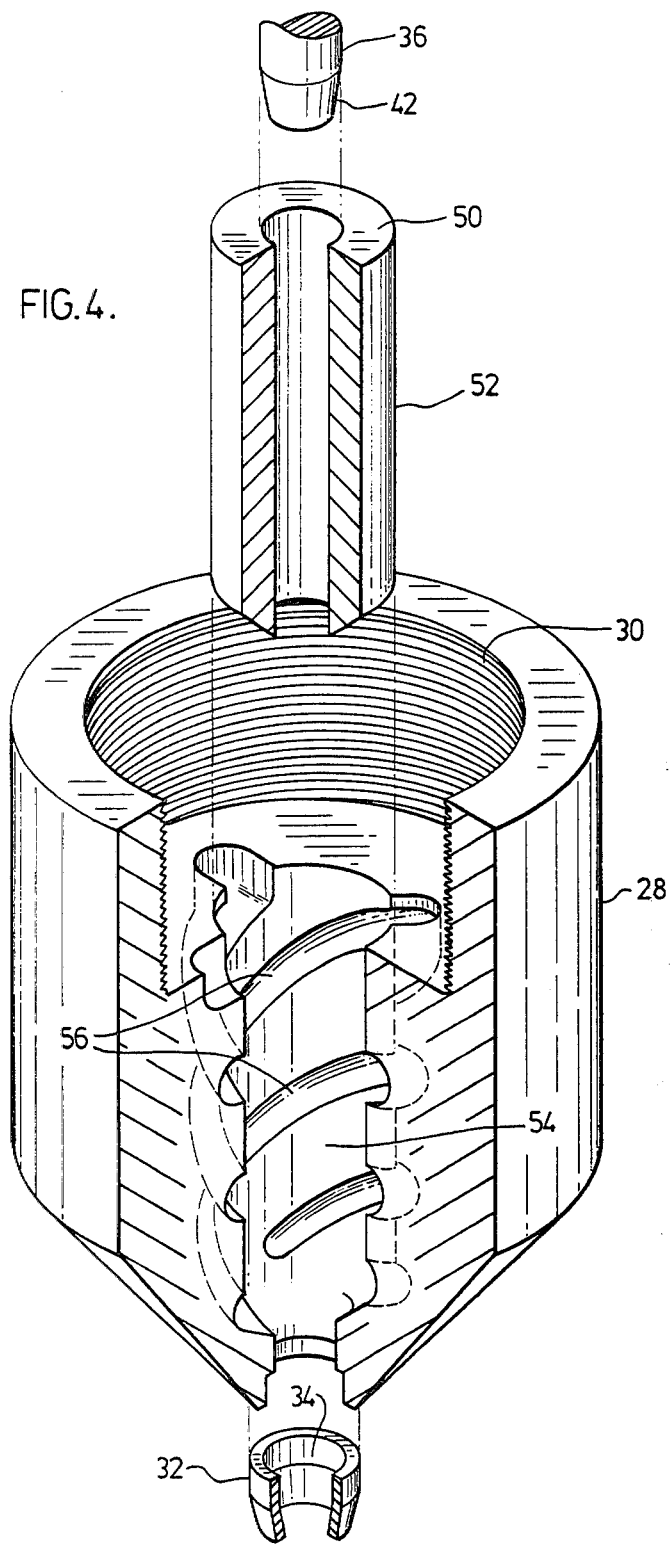
FIG. 4 is another cut-away exploded perspective view of a portion of the system seen in FIG. 1.
Figure 5:
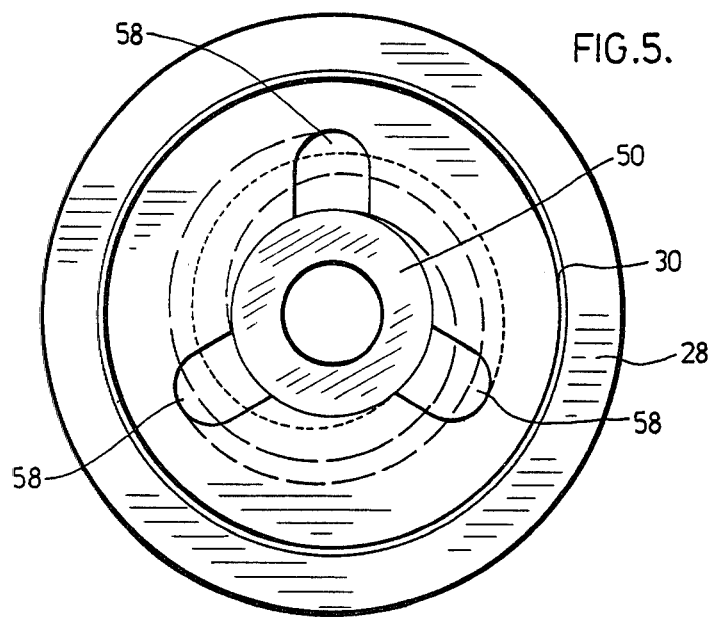
FIG. 5 is a plan view of the nozzle tip portion of the system seen in FIG. 1.
Figure 6:
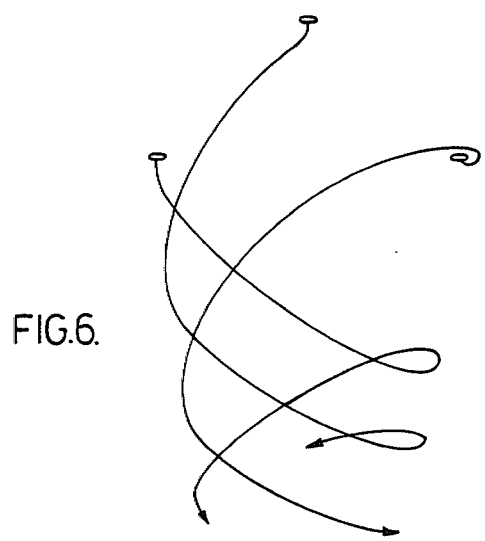
FIG. 6 is an illustration of the flow pattern of the melt through the nozzle tip portion.

The heater cast 14 has a heated portion 27 containing the heating element 20 and a nozzle tip portion 28 which is secured to the heated portion 27 by threads 30. As best seen in FIG. 2, a nozzle seal 32 having a hollow bore 34 is seated in the nozzle tip portion 28 of the heater cast 14 and extends across air space 24 to abut on the cavity plate 18 around the gate 16. While providing some additional heat flow to the melt in the gate area, the nozzle seal 32 is normally formed of titanium which has a relatively low thermal conductivity to avoid excessive heat loss to the cavity plate 18. The nozzle seal 32 also serves to prevent the escape of pressurized melt into air space 24.

A valve pin 36 is located in a generally cylindrical bore 38 in the heater cast 14 and has a peaked driven end 40 and a tip end 42 which is shaped to be seated in the hollow bore 34 of the nozzle seal 32 and the gate 16. Valve pin actuating mechanism includes an air operated piston 44 and a rocker arm 46 which is mounted to pivot on a pivot pin 48 seated in the back plate 13. As seen in FIG. 2, the cylindrical bore 38 through the heated cast 14 is enlarged in the nozzle tip portion 28 to receive therein a hollow cylindrical bushing 50 through which the valve pin 36 extends. The bushing 50 must be made so it fits closely around the valve pin 36 and also so its outer surface 52 abuts on the inner surface 54 of the nozzle tip portion 28 of the heater cast 14. The nozzle tip portion 28 of the heater cast 14 is formed with its inner surface 54 having three helical grooves 56 which gradually reduce in helical diameter and cross sectional area until they disappear immediately preceding the nozzle seal 32 adjacent the gate 16. The outer surface 52 of the cylindrical bushing 50 extends across the helical grooves 56, sealing them off to form three separate spiral-shaped melt flow channels 58. As may be seen, the hot runner passage 10 divides into three branches 60 in the heated portion 27 of the heater cast 14 and leads to these three channels 58 in the nozzle tip portion 28. The cylindrical bushing 50 extends only far enough that when the valve pin 36 is in the open position, the melt flowing through the three separate channels 58 converges into the valve pin bore 38 and then flows through the gate 16 and into the cavity 12. It will be appreciated that the threads 30 must be made to provide for alignment of the channels 58 between the heated portion 27 and the nozzle tip portion 28 of the heater cast 14, and that the entire hot runner passage structure must be designed to avoid any dead spots in the melt flow pattern. Furthermore, in the tightened position, the nozzle tip portion 27 must be secure enough that imparting the torque to the swirling melt will not loosen it.

Heat flow to the gate area is critical to the successful operation of the system. While there cannot be excessive heat which would result in the cooled cavity plate 18 being heated in the gate area, there must be sufficient heat to allow for reliable rapid operation of the gate. The heated portion 27 of the heater cast 14 is normally formed of beryllium copper which has a high heat conductivity to transfer heat to the nozzle tip portion 28. The nozzle tip portion 28 is normally formed of beryllium nickel which is not as conductive as beryllium copper, but the cylindrical bushing 50 is formed of beryllium cobalt copper which has a very high thermal conductivity to transfer heat from the heated portion 27 of the heater cast 14 to the melt.

In use, the valve pin 36 operates in a conventional manner to open and close the gate 16. Air pressure operates piston 44 to pivot rocker arm 46 which drives the valve pin 36 to the closed position with its tip end 42 seated in the gate 16, and when the air pressure is released and melt pressure reapplied by the molding machine, the melt pressure shifts the valve pin to the open position. In the open position, hot pressurized melt from the molding machine (not shown) flows through the hot runner passage 10, through the gate 16, and into the cavity 12. Just before entering the nozzle tip portion 28, the melt separates into the three spiral-shaped channels 58 and then converges again before passing through the gate. The flow through the spiral-shaped channels imparts a swirling motion to the melt as it passes through the gate, causing it to flow into the cavity with a curved motion. This swirling motion through the gate 16 is accelerated by the gradually reducing helical diameter of the helical channels 58 and also by the gradually reducing cross sectional area of the channels 58 which causes the flow of melt to increase in velocity as it approaches the gate 16. It is important that the swirling motion continue to be generated as close as possible to the gate and also that there be a minimum of melt to which a swirling motion is not imparted when the gate is first opened. Therefore, the channels 58 converge into the area formed in the bore 38 between the gate and the tip end 42 of the opened valve pin 36, and when the gate is closed, this area is occupied by the tip end 42 of the valve pin to minimize the volume of melt directly adjacent the gate.

Depending somewhat upon the shape of the cavity 12, this swirling motion of the melt as it passes through the gate 16 results in it flowing in the cavity outward from the gate with a curving motion at least near the gate. This curving motion combined with the fact that the melt in the cavity first solidifies adjacent the skin, thereby avoids unidirectional molecular orientation of the melt, at least adjacent the gate which is otherwise usually the weakest area.

Although the disclosure describes and illustrates a particular embodiment of the system, it is not to be construed in a limiting sense. Many variations and modifications may now occur to those skilled in the art. For example, the shape and number of the melt flow channels may vary somewhat while still imparting the curving motion of the melt entering the cavity.

The embodiments of the invention in which an exclusive property or privilege is claimed are defined as follows:

1. In a valve-gated injection molding system comprising a gate in a cavity plate leading to a cavity, a molding machine, a hot runner passage extending through a heated heater cast for conveying pressurized plastic melt from the molding machine to the gate, an elongated valve pin to reciprocate in a generally cylindrical bore in the heater cast between open and closed positions, the valve pin having a driven end and a tip end which is received in the gate in the closed position, and valve pin actuating mechanism, the improvement wherein at least a portion of the hot runner passage immediately preceding the gate is divided into a plurality of separate channels which converge again adjacent the gate, each channel being spiral shaped with the valve pin extending centrally therethrough, whereby a curving motion is imparted to the melt when it enters the cavity through the open gate thereby reducing unidirectional molecular orientation of the melt.

2. A system as claimed in claim 1 wherein the helical diameter of each channel gradually decreases towards the gate.

3. A system as claimed in claim 1 wherein the cross sectional area of each channel gradually decreases towards the gate.

4. A system as claimed in claim 1 wherein the separate channels extend through a nozzle tip portion of the heater cast which is threadably secured to the remainder of the heater cast.

5. A system as claimed in claim 4 wherein the nozzle tip portion of the heater cast has an inner surface which defines the cylindrical bore, the cylindrical bore being enlarged in the nozzle tip portion to receive therein a hollow generally cylindrical bushing through which the valve pin extends, the inner surface of the heater cast being interrupted by a plurality of helical grooves, the cylindrical bushing having an outer surface which extends across the grooves whereby the grooves form the separate channels of the hot runner passage.

6. A system as claimed in claim 5 wherein a hollow generally cylindrical thermally conductive seal having a central bore is received in a radially inwardly open cylindrical recess provided in the nozzle tip portion of the heater cast, said recess being open axially downwardly and sized to snugly receive said seal so that the surface of the bore of said seal and the axially adjacent surface of the nozzle bore are continuous, said seal projecting across an air space separating the nozzle tip portion of the heater cast from the cavity plate to be in bearing contact with the cavity plate adjacent the gate upon thermal expansion of the heater cast.

7. A system as claimed in claim 4 or 5 wherein there are three separate channels in the nozzle tip portion of the heater cast.

* * * * *